United States Patent [19]

Borbas et al.

[11] 3,993,872

[45] Nov. 23, 1976

[54] RANDOM NUMBER GENERATOR FOR A TRAFFIC DISTRIBUTOR

[76] Inventors: Robert A. Borbas, Box 818; James H. Foster, 33 Marsha Drive, Apt. 11, both of Brockville, Ontario, Canada

[22] Filed: Sept. 27, 1974

[21] Appl. No.: 509,981

[52] U.S. Cl. .......... 179/18 ES

[51] Int. Cl.[2] .......... H04Q 3/54

[58] Field of Search .......... 179/18 ES, 27 D

[56] References Cited

UNITED STATES PATENTS

| | | | |
|---|---|---|---|
| 3,626,108 | 12/1971 | Oswald et al. | 179/18 ES |
| 3,718,907 | 2/1973 | Altenburger | 179/27 D X |
| 3,787,635 | 1/1974 | Kammerl et al. | 179/18 ES |

*Primary Examiner*—Thomas W. Brown

[57] ABSTRACT

A free running counter is sampled for a random number and the number is stored at the start of a cycle initiated by a central processor. The central processor also provides a range digit to a shift register. A traffic distributor control then controls an internal cycle to form a product from the range digit (number) and the random number from the free running counter. The final random number produced will be returned to the processor and will be less than the range digit given to the traffic distributor from the processor.

7 Claims, 5 Drawing Figures

RANDOM NUMBER GENERATOR FOR A TRAFFIC DISTRIBUTOR

BACKGROUND OF THE INVENTION

1. Field of the Invention

The invention relates to the generation of a random number for use by a central processor of a telephone communication switching system; and more particularly to generating a random number less than a predetermined number produced by the central processor.

2. Description of the Prior Art

The invention was developed for the system shown in U.S. Pat. No. 3,767,863, issued Oct. 23, 1973, by Borbas et al for a Communication Switching System with Modular Organization and Bus, hereinafter referred to as the System S2 patent. The processor for this system is shown in a co-pending application, Central Processor, to Borbas et al, Ser. No. 510,092, filed the same day as this application.

In a common control telephone office, one of the functions performed by the central processor controlling the system is the selection of pieces of equipment to be used on any given call (registers, trunks, links, etc.). In most cases reliability considerations dictate that the initial choice be random. However, because the total number of units in any one set can vary, it is difficult to select a totally random unit if the processor has access to only a random number. To help solve this problem in System S2 it was decided to build a specialized random number generator. In this case the processor would be able to specify a range digit ($0 \leqslant X \leqslant 255$) or ($0 \leqslant X \leqslant FF$) in hexadecimal notation, prior to the generation of the random number. The traffic distributor receives this range digit and then calculates a random number Y such that $0 \leqslant Y < X$ and returns it to the processor on request.

SUMMARY OF THE INVENTION

According to the invention, a free running counter is sampled randomly to provide the initial randomness to the system. At the start of a cycle the counter is sampled and stored. An adder and shift register then perform an add/shift type of sequencing using the range digit from the central processor and performs a product with the counter number stored. A sequencing control is provided to sequence the system through the add/-shift cycle. An overall cycle control cycles the system through the necessary add/shift cycles and shift cycles to form the required random number.

A first object of the invention is to generate a random number;

A second object of the invention is to provide a random number less than an initial start number provided;

A final object of the invention is to provide an improved traffic distributor for a telephone system.

BRIEF DESCRIPTION OF THE DRAWING

The above-mentioned and other features and objects of this invention and the manner of obtaining them will be more apparent, and the invention itself will be best understood by reference to the following description of an embodiment of the invention taken in conjunction with the accompanying drawings, in which.

DESCRIPTION OF THE PREFERRED EMBODIMENT

Figure 1:
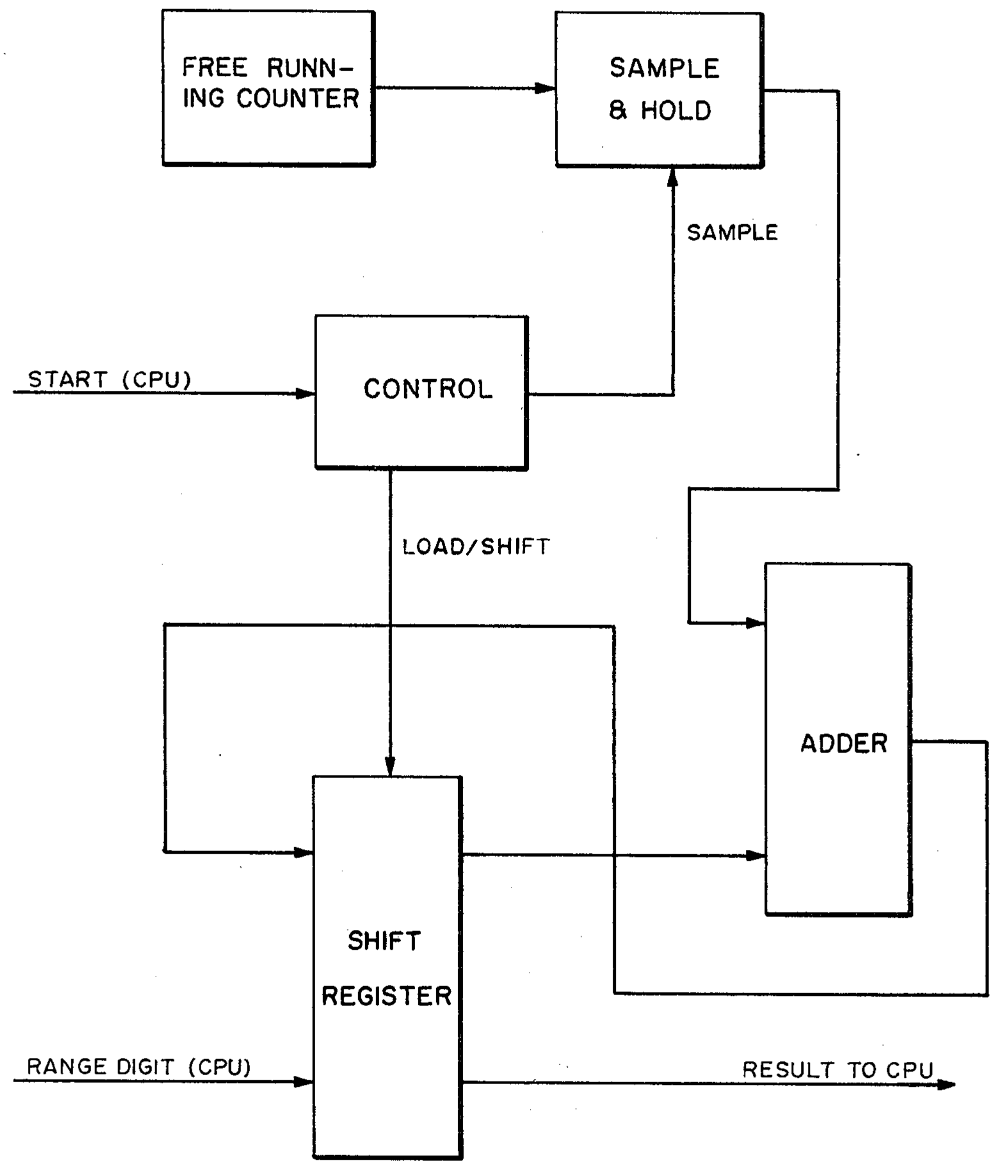
FIG. 1 is a block diagram of the invention.

FIG. 1 shows the overall block diagram of the invention. A free-running counter is coupled to a store which performs the sample and hold function for the number obtained from the counter. The store is then coupled to an 8-bit adder which is in turn coupled to a 16-bit shift register. A range digit is coupled from the processor into the shift register. The shift register is also coupled to the adder. A control block is coupled to the store to tell the store to sample the counter on command from the central processor (CPU). This control also contains an acknowledging control circuit for communicating with the databus, sequencing control circuit, and an overall cycle control circuit. The control is also coupled to the shift register to perform the load/shift sequences necessary to produce the random number product. For further details on the databus communication see U.S. Pat. No. 3,812,297, issued May 21, 1974, by Borbas for a Bus Control Arrangement for a Communication Switching System.

In operation the counter is accessed at random times, (the start of each output cycle to the traffic distributor) thus imparting "the randomness" to the final result. As mentioned above the traffic distributor (TRD) is given a range digit X from the central processor via the databus and calculates a final product random number Y such that $0 < Y < X$. The traffic distributor calculates the result Y by multiplying the range digit X by the sample received from the counter, and dividing the result by 256For example if the counter sample is R, then:

$$Y = \frac{X \cdot R}{256} \text{ or } \frac{X \cdot R}{10016}$$

In the above formula $0 \leqslant R \leqslant 225$ and therefore $0 \leqslant Y < X$. Thus, because a "range" has been given to the traffic distributor, selection of a random unit out of a group of given size is made much less complex and with a greater degree of "randomness".

This multiplication operation in the traffic distributor is carried out in the following manner: the traffic distributor starts with a 16-bit shift register set all to 0's, an 8-bit random number, and an 8-bit range number provided by the central processor via the databus. The traffic distributor looks at bit 8 (the least significant bit) of the range number; if it is a 1, it adds the random number to bits 9–16 of the 16-bit register. If bit 8 is a 0, the addition does not take place. Next it looks at the bit 7, and if it is a 1 it adds the random number to bits 8–15 of the 16-bit register. It continues this operation until it finally examines bit 1 of the range number, and if it is a 1, it adds the random number to bits 1–8 of the 16-bit register. In this way, it forms the 16-bit product of the two 8-bit words. In effect, if the random number is 01011001, and the range number is 10110011, the product will be:

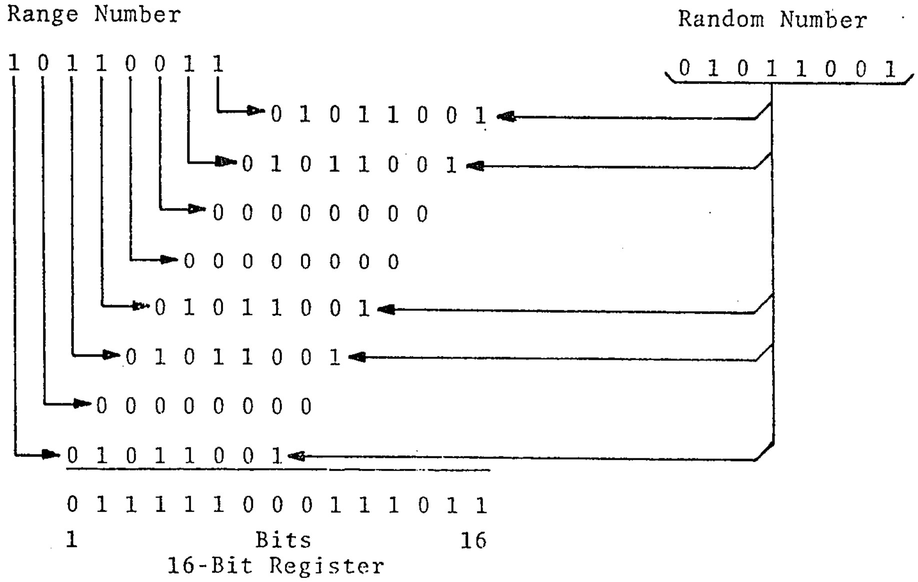

The 8 most significant bits from the 16-bit register (bits 01111100) will then be sent to the CPU as the random number Y.

The sequence of this operation is that on a data out cycle the CPU via the databus sends the range digit to the traffic distributor. Upon detecting the data out cycle the traffic distributor stores the range number X and proceeds to calculate the random number Y. This number as calculated above is then stored in the traffic distributor until the CPU requests it by a data in cycle via the databus.

Figure 2A:
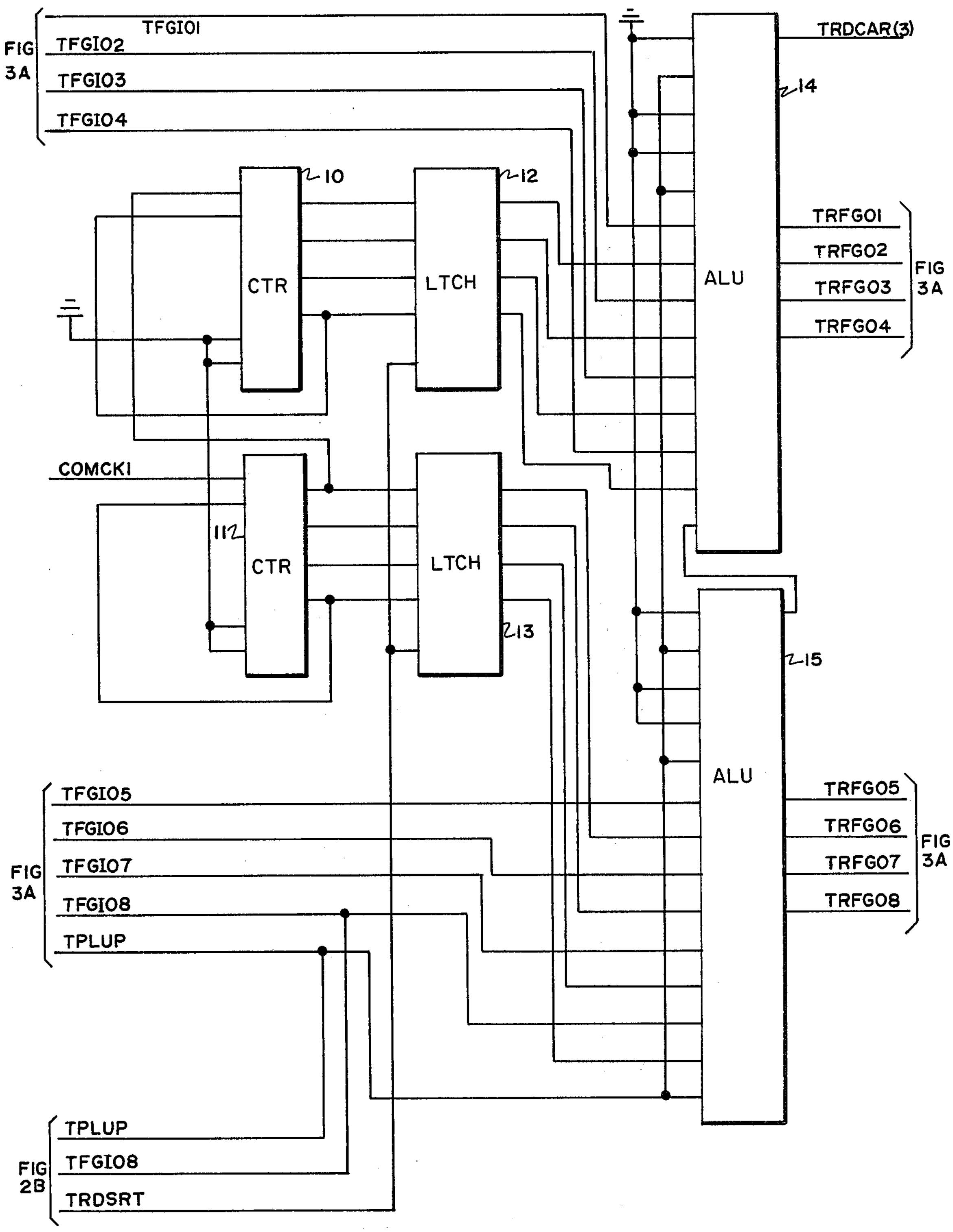
FIG. 2 (2A and 2B) and FIG. 3 (3A and 3B) are schematic diagrams of the traffic distributor.
Figure 2B:
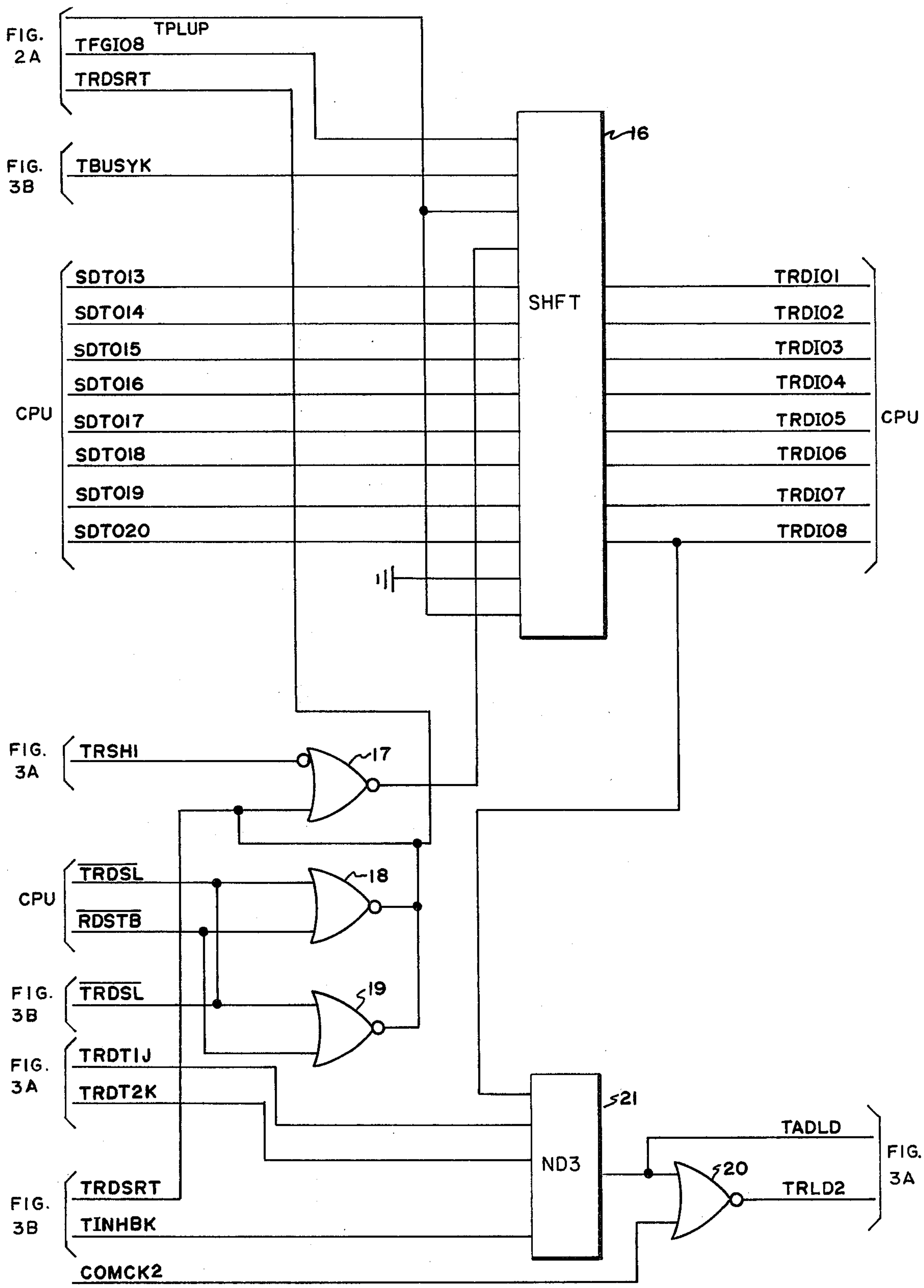
Figure 3A:
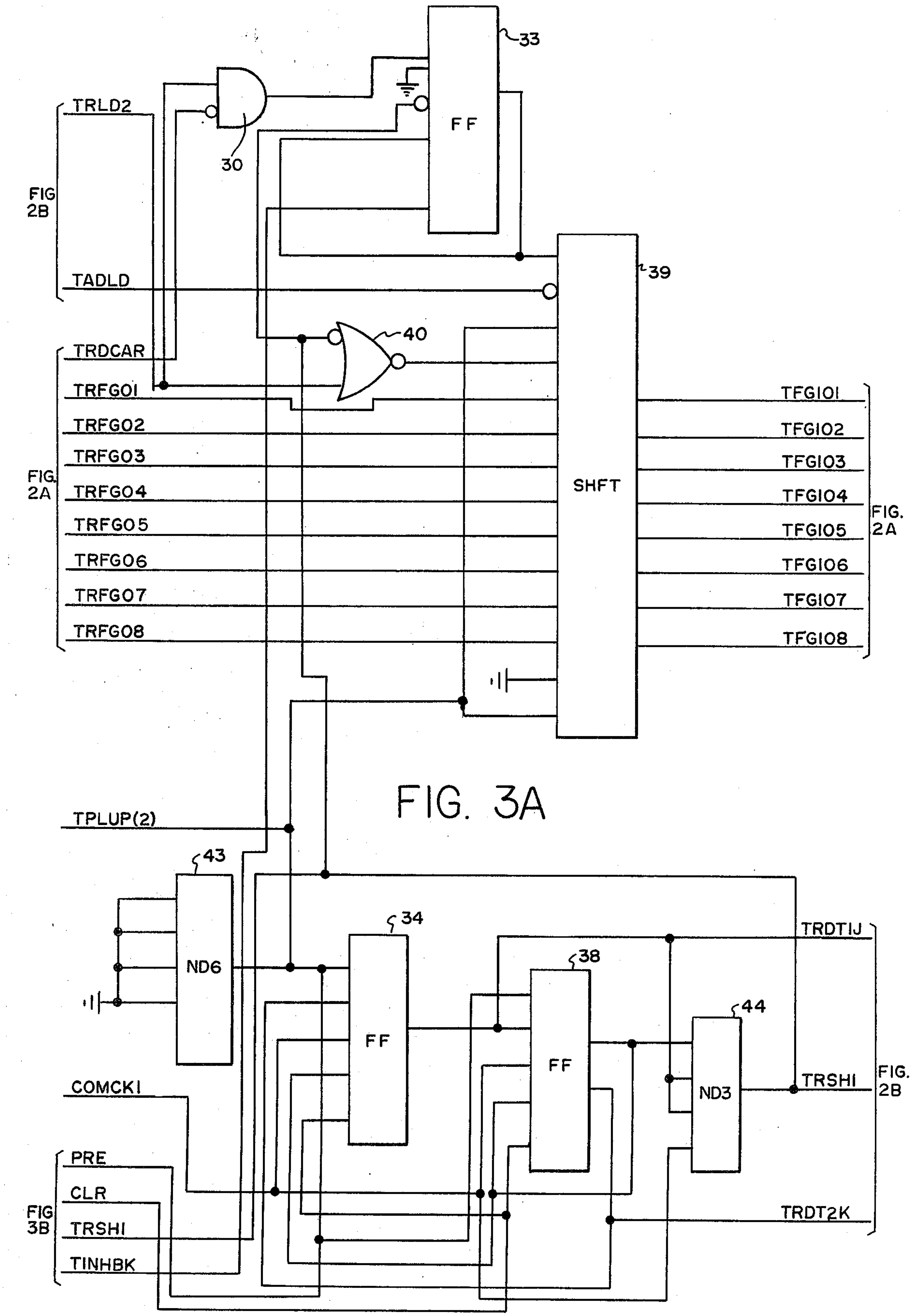
Figure 3B:
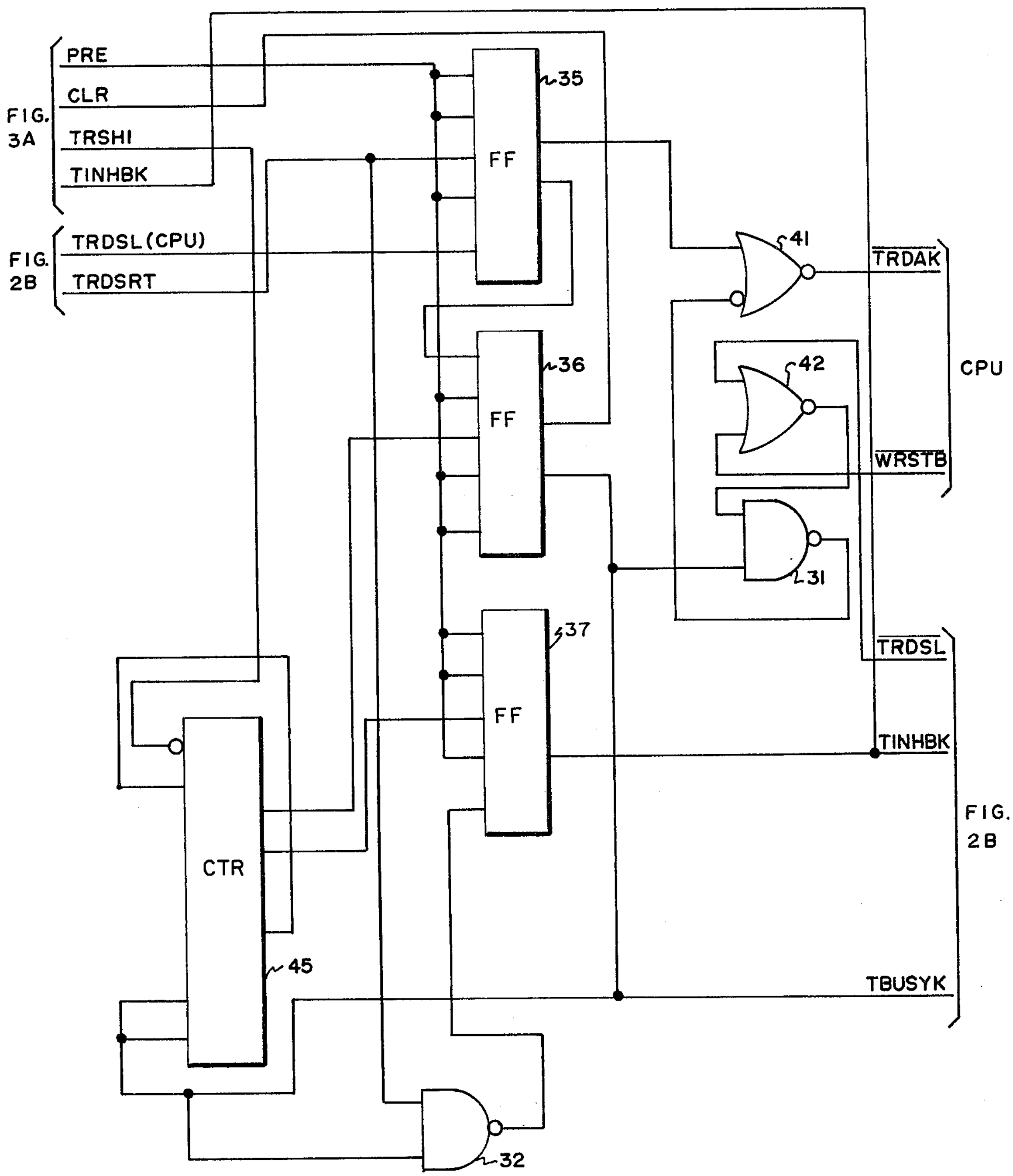

The schematic diagram of the circuit is shown on FIGS. 2 and 3. This circuit is composed of 7400-Series Transistor Transistor Logic (TTL). In particular the commercial 7400 circuits on FIG. 2 include counters 10 and 11 which are 7493 4-bit binary counters, latches 12 and 13 which are 74100 dual 4-bit bistable latches, arithmetic units 14 and 15 are 74181 4-bit arithmetic and logic units, shift register 16 is a 74198 8-bit shift register, gates 17–20 are 7402 quad 2 NOR gates, and gate 21 is a 7420 dual 4 NAND gate. The counters 10 and 11 form the free-running counter, the latches 12 and 13 form the store to perform the sample and hold functions, the arithmetic units 14 and 15 form the 8-bit adder, and the shift register 16 and shift register 39 (FIG. 3) form the 16-bit shift register to store the range number and the product Y.

FIG. 3 is also composed of commercial 7400 series including gates 30–32 which are 7400 quad 2 NAND gates, flip-flops, 33–38 which are 7476 dual J-K flip-flops, shift register 39 is a 74198 8-bit shift register, gates 40–42 are 7402 quad 2 NOR gates, gate 43 is a 7440 dual 4 NAND gate, gate 44 is a 7420 dual 4 NAND gate, and counter 45 is a 7493 4-bit binary counter. Flip-flops 34 and 38, and gate 44 form the sequencing control. Flip-flop 35, and gates 31, 41, and 42 form the acknowledge circuit. Counter 45, flip-flops 36, 37, and gate 32 form the overall cycle control.

Referring now to FIG. 1, the sequence for calculating the random number Y is as follows. During the previous cycle shift register 39 is cleared, so it starts at a 0 on the next cycle. When the traffic distributor is selected by a data out cycle NOR gates 18 and 19 generate TRDSRT (TRD start). This signal is coupled to the latches 12 and 13 and clocks the contents of the free-running counter 10 and 11 into latches 12 and 13. The free-running counter 10 and 11 is driven by a 5 MHZ clock source from any convenient clock. This clock, of course, could be provided with this circuit. The signal TRDSRT also clocks the range number X into shift register 16 and sets flip-flop 35 on FIG. 3. Flip-flop 35 sends back TRDAK (TRD acknowledge) to the CPU and sets flip-flop 36 (TRD busy). Flip-flop 36 releases the clear signal to flip-flops 34 and 38, and to counter 45 allowing the sequencing to start.

The overall cycle to produce the product Y requires 8 add/shift cycles, along with 8 shift cycles to form the 16-bit product and get the 8 most significant bits into the proper position to return then to the CPU. Shift registers 16 and 39 perform the shifting part of the add/shift sequence used to form the product. One shift-/add sequence consists of flip-flops 34 and 38 going through the states 00, 10, 11, and 00. In the 10 state, the contents of latches 12 and 13 are added to the contents of shift register 39 if the least significant bit of shift register 16 is a 1. If the least significant bit is a 0 gate 21 prevents the addition from taking place. At the same time, any carry bit caused by the addition of the two 8-bit words in latches 12 and 13 and shift register 39 is stored in flip-flop 33, to be transferred to the shift register during the shift portion of the sequence. When flip-flops 34 and 38 are both set, the contents of shift registers 16 and 39 are shifted one bit down. If a carry condition existed during the add portion, the 1 in flip-flop 33 is transferred into the most significant bit position of shift register 39. The signal TRSHI initiates this data shift and advances counter 45 by 1. Then the sequencing control (flip-flops 34 and 38) returns to the 00 state, ready to start another add/shift sequence, and continues until the eighth TRSHI pulse.

At this point, flip-flop 37 (TRD inhibit) is set and the 16-bit product is now contained in shift registers 16 and 39. All that remains is to serially shift the 8 most significant bits of the product (in shift register 39) into shift register 16 and then clear shift register 39. This is accomplished by allowing the sequence control to go through 8 more cycles, while inhibiting any addition with signal TINHBK from flip-flop 37 to gate 21. During the shift portion of the cycle, flip-flop 33 is held reset by the TINHBK signal from flip-flop 37 on its clear lead. This causes a 0 to be held in the first input of shift register 39, which clears the shift register after 8 shift cycles. After the 16th cycle of the sequence control, flip-flop 36 is reset which stops the sequence control and halts any further activity in the traffic distributor. The traffic distributor is now ready to return the random number Y, stored in shift register 16, when the CPU requests it.

While principles of the invention have been illustrated above in connection with specific apparatus and applications, it is to be understood the description is made only by way of example and not as a limitation on the scope of the invention as encompassed by the following claims.

What we claim is:

1. A random number generator for a traffic distributor for a communication switching system, said system comprising numerous subsystems, a central processor controlling the subsystems, and wherein said central processor produces a range digit, said random number generator comprising:

counter means for providing random counter numbers;

storage means connected to said counter means for sampling and storing a random counter number in response to a command from said central processor;

adder means connected to said storage means for receiving said random counter number;

shift register means connected to said central processor and to said adder means for storing said range digit from said central processor and a final random number upon generation thereof;

said adder means and said shift register means providing a final random number derived as a product of said random counter number and said range digit in a load/shift sequence, said final random number being less than said range digit; and control means connected to said central processor, said shift register means, and said storage means for receiving said command from said central processor to initiate storage of said random counter number in said storage means and to control said load/shift sequence between said adder means and said shift register means for storing said final random number in said shift register means;

whereby when a range digit is coupled from the processor to said shift register means said random number generator produces said final random number less than said range digit to be returned to said central processor.

2. A random member generator as claimed in claim 1 wherein said counter means comprises:

free running counter means.

3. A random number generator as claimed in claim 1 wherein said storage means comprises:

hold means; and sample means.

4. A random number generator as claimed in claim 1 wherein said control means comprises:

sequencing control means; and cycle control means.

5. A random number generator as claimed in claim 1 wherein said shift register means comprises:

a 16-bit shift register.

6. A random number generator as claimed in claim 1 wherein said adder means comprises:

an 8-bit adder with carry logic.

7. A random number generator as claimed in claim 1 wherein:

said counter means comprises, free running counter means;

said storage means comprises, hold means, and sample means;

said control means comprises, sequencing control means, and cycle control means;

said shift register means comprises, a 16-bit shift register; and said adder means comprises, an 8-bit adder with carry logic.

* * * * *